United States Patent
Hazra et al.

(10) Patent No.: US 9,697,027 B1
(45) Date of Patent: Jul. 4, 2017

(54) HYPERCALL-BASED SECURITY FOR HYPERVISORS

(71) Applicant: CA, Inc., Islandia, NY (US)

(72) Inventors: Tanmoy Hazra, Andhra Pradesh (IN); Kiran Prakash Diwakar, Maharashtra (IN); Venkata Krishna Venu Gopala Rao Bezawada, Andhra Pradesh (IN)

(73) Assignee: CA, INC., Islandia, NY (US)

( * ) Notice: Subject to any disclaimer, the term of this patent is extended or adjusted under 35 U.S.C. 154(b) by 303 days.

(21) Appl. No.: 13/933,308

(22) Filed: Jul. 2, 2013

(51) Int. Cl.
G06F 9/455 (2006.01)

(52) U.S. Cl.
CPC .................. *G06F 9/45541* (2013.01)

(58) Field of Classification Search
None
See application file for complete search history.

(56) References Cited

U.S. PATENT DOCUMENTS

| | | | |
|---|---|---|---|
| 2003/0115322 A1* | 6/2003 | Moriconi ............... | G02B 6/132 709/224 |
| 2006/0130060 A1* | 6/2006 | Anderson ........... | G06F 9/45533 718/1 |
| 2011/0047542 A1* | 2/2011 | Dang et al. ........................ | 718/1 |
| 2012/0291027 A1* | 11/2012 | Chiang et al. ..................... | 718/1 |
| 2013/0132690 A1* | 5/2013 | Epstein ............... | G06F 12/1416 711/159 |

FOREIGN PATENT DOCUMENTS

WO   WO 2010/074885 A1   7/2010

OTHER PUBLICATIONS

Fox Technologies, "Access Management Software | Fox Technologies", downloaded Jun. 10, 2013 from http://www.foxt.com/, 2 pp.
HyTrust, "How it Works", downloaded Jun. 10, 2013 from http://www.hytrust.com/products/how-it-works, 2 pp.
HyTrust, "Virtualization Management Solutions, Virtualization Vmware Compliance—HyTrust", downloaded Jun. 8, 2013 from http://www.hytrust.com/products/overview, 2 pp.
IBM Research, Technical Paper "sHype: Secure Hypervisor Approach to Trusted Virtualized Systems", downloaded Jun. 10, 2013 from http://domino.watson.ibm.com/library/cyberdig.nsf/3addb4b88e7a231f85256b3600727773/265c8e3a6f95ca8d85256fa1005cbf0f?OpenDocument&Hiqhlight=0,Hypervisor, 14 pp.
Libvirt, "libvirt: The virtualization API", downloaded Jun. 10, 2013 from http://libvirt.org.

(Continued)

*Primary Examiner* — Emerson Puente
*Assistant Examiner* — Steven Do
(74) *Attorney, Agent, or Firm* — Sage Patent Group

(57) ABSTRACT

Hypercalls for a host machine and guest machines to a hypervisor are intercepted and routed to the hypervisor for execution on a hardware platform, responsive to the hypercall passing hypercall access rules. The intercepting may be performed by a hypercall access control layer that reloads a hypercall table that maps hypercalls from a host machine and guest machines to hypercall handlers, to identify a hypercall access control handler as the hypercall handler for the host machine and the guest machines. Upon passing the hypercall access rules, the hypercall is passed to the hypervisor.

20 Claims, 11 Drawing Sheets

(56) References Cited

OTHER PUBLICATIONS

Linux Foundation Collaborative Projects, "Main Page—Xen wiki", downloaded Jul. 1, 2013 from http://wiki.xensource.com/wiki/Main_Page, 2 pp.
Linux™, "Virtualization in Xen 3.0", *Linux Journal*, downloaded Jul. 1, 2013 from http://linuxjournal.com/article/8909, 5 pp.
LynuxWorks™, "Desktop Virtualization and Secure Client Virtualization Based on Military-Grade Technology" downloaded Jul. 1, 2013 from http://www.lynuxworks.com/virtualization/secure-client-virtualization.php, 5 pp.
Oracle, "Oracle VM Manager Web Services API Reference", downloaded Jul. 1, 2013 from http://docs.oracle.com/cd/E11081_01/doc/web.21/e14979/toc.htm, 2 pp.
Wikipedia, the free encyclopedia, "Logical Domains", downloaded Jul. 1, 2013 from http://en.wikipedia.org/w/index.php?title=Logical_Domains&printable=yes, 5 pp.
Gossamerthreads, "Using Xen's Hypercall Interface", downloaded Nov. 18, 2015 from http://www.gossamer-threads.com/lists/xen/devel/338251, 4 pp.

* cited by examiner

HYPERCALL-BASED SECURITY FOR HYPERVISORS

BACKGROUND

Various embodiments described herein relate to computer systems, methods and program products and, more particularly, to virtualized computer systems, methods and computer program products.

A Virtual Machine (VM) is a software implementation of an underlying machine (i.e., a computer) that executes programs like a physical machine. A virtual machine can provide a complete system platform which supports the execution of a complete operating system. The virtual machine may emulate an existing architecture, and may provide a platform to run programs where the real hardware is not available for use and/or may provide multiple instances of virtual machines to allow more efficient use of computing resources. Virtualization is often used in a cloud computing environment, where the physical hardware configuration is hidden from the end user.

A hypervisor, or Virtual Machine Monitor (VMM) is computer software, firmware and/or hardware that creates and runs virtual machines. The underlying hardware or virtual infrastructure on which the hypervisor is running one or more virtual machines may be referred to as a "hardware platform". Each virtual machine is referred to as a "guest machine". A host machine may also be provided. The hypervisor presents the host machine and guest machine operating systems with a virtual operating platform and manages the execution of the host and guest machine operating systems. Multiple instances of a variety of operating systems may share the virtualized hardware resources.

BRIEF SUMMARY

Various embodiments described herein can provide virtualization methods, systems and/or computer program products that intercept a plurality of hypercalls for a host machine and a plurality of guest machines to a hypervisor and route a respective one of the hypercalls to the hypervisor for execution on a hardware platform, responsive to the respective one of the hypercalls passing hypercall access rules. Accordingly, security access may be implemented at the hypervisor level, instead of or in addition to implementation at the host machine and/or guest machine(s), which can reduce the likelihood of a compromised host and/or guest machine from adversely impacting the security of the host machine and/or the guest machines.

In some embodiments, the intercepting is performed by a hypercall access control layer that provides access control between the host machine, the plurality of guest machines and the hypervisor. Specifically, in some embodiments, the hypervisor includes a respective hypercall table that maps hypercalls for a respective host machine and guest machine to hypercall handlers, and the intercepting comprises reloading the respective hypercall table to identify a hypercall access control handler as the hypercall handler for the respective host machine and guest machine. The reloading may be performed during initialization and/or installation of the hypercall access control layer.

In some embodiments, the intercepting is preceded by populating a rules database with hypercall access rules for the host machine and the plurality of guest machines, including applications and users. The populating may be performed by receiving commands from a single access control console.

In other embodiments, a plurality of hypercalls for a host machine and a plurality of guest machines to a plurality of hypervisors may be intercepted. Thus, in some embodiments, the hypercall access control layer can provide access control between a host machine, a plurality of guest machines and a plurality of hypervisors.

It will be understood that various embodiments have been described above in connection with virtualization methods. However, various other embodiments described herein can provide computer program products that can provide virtualization according to any of the embodiments described herein.

Moreover, various other embodiments described herein can provide a virtualized computer system. The virtualized computer system may comprise a hardware platform, a host machine and a plurality of guest machines that run on the hardware platform, and a hypervisor that manages the host machine and the plurality of guest machines that run on the hardware platform. A hypercall access control layer provides access control between the host machine, the plurality of guest machines and the hypervisor. In some embodiments, the hypercall access control layer is included in the hypervisor itself.

The hypercall access control layer may be configured to perform operations comprising intercepting a plurality of hypercalls for the host machine and the plurality of guest machines to the hypervisor, and routing a respective one of the hypercalls to the hypervisor for execution on the hardware platform responsive to the respective one of the hypercalls passing hypercall access rules.

In some embodiments, a hypervisor includes a respective hypercall table that maps hypercalls for a respective host machine and guest machine to hypercall handlers, and the intercepting comprises reloading the respective hypercall table to identify a hypercall access control handler as the hypercall handler for the respective host machine and guest machine. The reloading may be performed during initialization or installation of the hypercall access control layer.

Moreover, the intercepting may be preceded by populating a rules database with the hypercall access rules for the host machine and the plurality of guest machines. The populating may be performed by receiving commands from a single access control console. Moreover, a plurality of hypervisors may be provided, and the hypercall access control layer may provide access control between a host machine and a plurality of guest machines and a plurality of hypervisors.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Figure 1:
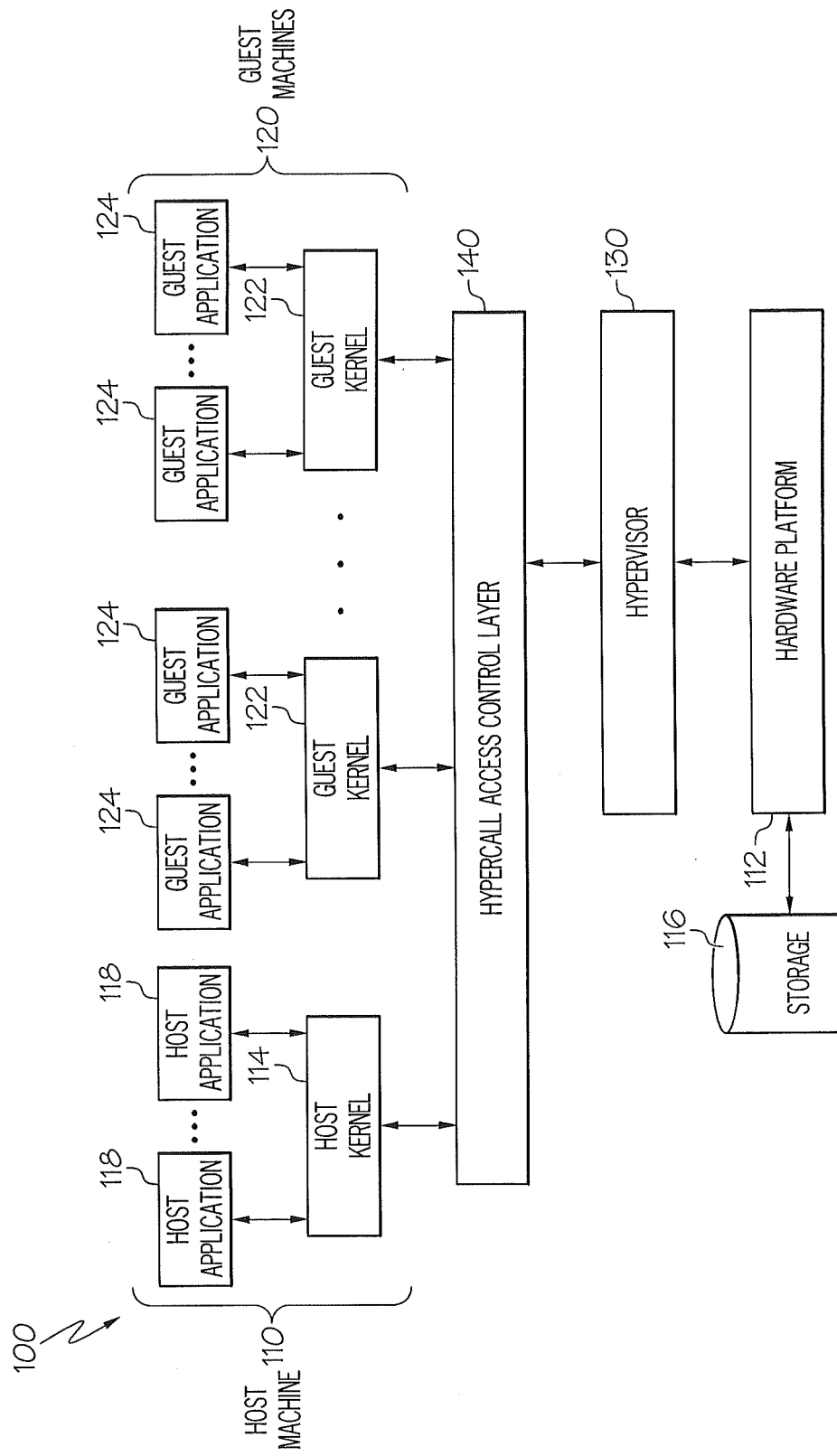
FIG. 1 is a block diagram of systems, methods and/or computer program products for providing hypercall-based security for hypervisors according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" (and variants thereof) when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or otherwise structured to do so. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Various embodiments described herein can provide hypercall-based security for hypervisors. As is well known, a hypercall is a software trap from a domain to a hypervisor, just as a system call is a software trap from an application to a kernel. Stated differently, a hypercall is to a system call what a hypervisor is to an operating system. Host and guest machines use hypercalls to a hypervisor to request operations from the hardware platform.

Various embodiments described herein can provide hypercall-based security for hypervisors by intercepting a plurality of hypercalls for a host machine and a plurality of guest machines to a hypervisor and routing a respective one of the hypercalls to the hypervisor for execution on a hardware platform, responsive to the respective one of the hypercalls passing hypercall access rules. The access rules may be specified for a respective host machine, guest machine, guest application, user and/or groups of (including all) guest machines, guest applications and/or users. The intercepting may be performed by a hypercall access control layer that provides access control between the host machine, the plurality of guest machines and the hypervisor.

Various embodiments described herein may arise from recognition that, in a virtualized environment, a compromise in a host machine or guest machine may compromise the hypervisor, the guest machines and/or the host machine. In present day virtualization environments, a hypervisor may be used to control the security for the hypervisor, for the underlying hardware, as well as virtual machines running on top of the hypervisor. While this may be a workable solution provided by a vendor natively, it may rely heavily on the hypervisor management software, running on the host operating system, to take appropriate security measures when invoking the underlying virtual resources made available by the hypervisor. For example, the HyTrust® Virtual Appliance resides outside the hypervisor server and operates between a VMware vCentre Server and Virtualization Management Clients to intercept all the administrative requests to the virtual infrastructure.

However, in trying to solve the security problem in virtualized environments, the security is not close to the hardware platform. Using the analogy of physical security for a home, a gate on the fence/compound of the house provides security, and so does the peephole on the door of the house. While both help in securing the house and the residents, breaching the gate on the fence is slightly easier (and does not ensure security within), compared to breaching the door (that has the peephole and/or video-doorphone). Bringing the security mechanism into close proximity to the asset which needs security can reduce security risk and can provide better security.

Various embodiments described herein can take the security as close to the resource as possible, in this case the hardware platform and related resources of the host machine. Thus, various embodiments described herein can provide a single-point hypercall access control layer, also referred to as an "abstraction layer" that can be common and unique across hypervisor vendors. This abstraction layer, residing on top of the hypervisor, can intercept the hypervisor calls for virtual resources, hardware and hypervisor software manipulation, can verify required permissions and then can move the calls to the necessary kernel and/or hypervisor calls if permission is verified.

Accordingly, various embodiments described herein can provide a solution that can be common across multiple vendors, i.e., a unified solution for heterogeneous virtual infrastructures. The security layer can be closer to the resources being secured, by placing security below the kernels and above the hypervisor level. Moreover, as will be described in detail below, the concept of hypercall table reload may be used in the context of hypervisor related security, to implement the security close to the resource by intercepting the hypercall.

In other embodiments, security may be orchestrated across different hypervisors from a single console to self-written policies as well as predefined policies that are imported from other systems. Fine grained access policies may thereby be provided for virtual machine access management.

FIG. 1 is a block diagram of a virtualized computing environment 100 according to various embodiments described herein. Referring now to FIG. 1, the virtualized computing environment 100 generally hosts and manages one or more guest machines 120, each of which runs a guest kernel 122 and one or more guest software applications 124. The computing needs of users (e.g., humans and/or other virtual/non-virtual machines) may drive the functionality of the guest machines 120. In some embodiments, the virtualized computing environment 100 may also host and manage a host machine 110 that runs a host kernel 114 and one or more host applications 118. A hypervisor 130 can provide an interface between the guest machines 120, the host machine 110 and a hardware platform 112 capable of supporting the host machine 110 and the guest machines 120. A data storage space 116 may be accessed by the hardware platform 112.

The hardware platform 112 generally refers to any computer system capable of implementing the host machine 110 and the guest machines 120, which may include, without limitation, a mainframe computer platform, personal computer, mobile computer (e.g., tablet computer), server, wireless communication terminal (e.g., cellular data terminal), or any other appropriate program code processing hardware. The hardware platform 112 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 112 may be further connected to the data storage space 116 through serial and/or parallel connections. The data storage space 116 may be any suitable device capable of storing computer-readable data and program code, and it may include logic in the form of software applications, random access memory (RAM), or read only memory (ROM), removable media and/or any other suitable memory component.

Besides acting as a host for computing applications that run on the hardware platform 112, the host kernel 114 may operate at the highest priority level in the virtualized computing system 100, executing instructions associated with the hardware platform 112, and it may have exclusive privileged access to the hardware platform 112. The priority and privileged access of hardware resources affords the host kernel 114 exclusive control over resources and instructions, and may preclude interference with the execution of different application programs or the operating system. The host kernel 114 can create an environment for hosting the guest virtual machines 120. One host kernel 114 is capable of supporting multiple isolated guest machines 120 simultaneously.

The hypervisor 130 (which may also be known as a virtual machine monitor/manager or VMM) provides an interface between the host machine 110, the guest machines 120 and the hardware platform 112. The hypervisor 130 virtualizes the computer system resources and facilitates the operation of the guest machines 120. The hypervisor 130 may provide the illusion of operating at the highest priority level to the guest kernels 122. However, the hypervisor 130 can map the guest operating system's priority level to a priority level lower than the top most priority level. As a result, the hypervisor 130 can intercept the guest kernels 122, and execute instructions that require virtualization assistance. Alternatively, the hypervisor 130 may emulate or actually execute the instructions on behalf of the guest kernels 122. Software operations permitting indirect interaction between the guest kernels 122 and the physical hardware platform 112 can also be performed by the hypervisor 130. When operating in a virtualized environment, the guest machines 120 present a virtualized environment to the guest kernels 122, which in turn provide an operating environment for guest applications 124 and other software constructs.

Figure 2:
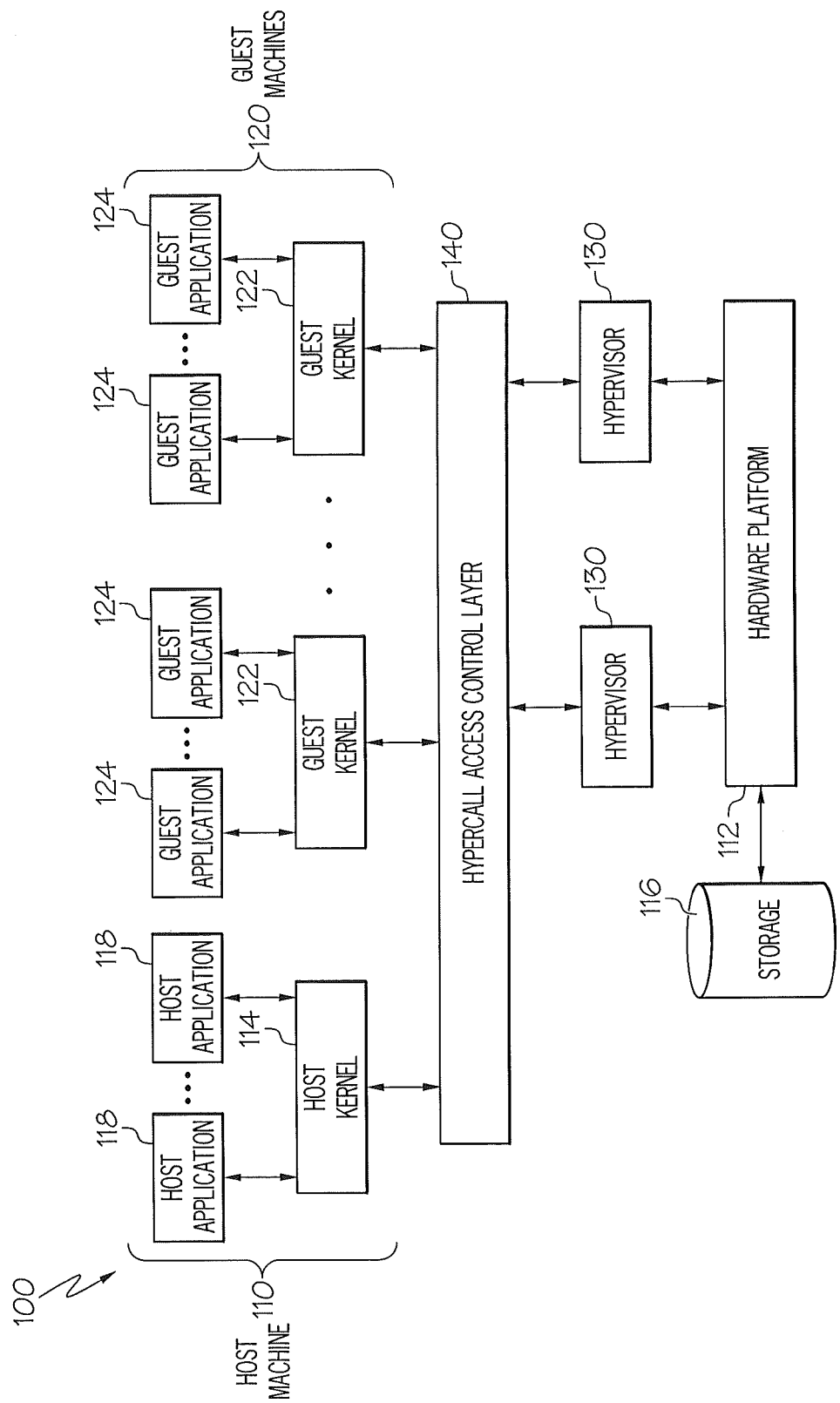
FIG. 2 is a block diagram of systems, methods and/or computer program products for providing hypercall-based security for hypervisors according to various other embodiments described herein.

Still referring to FIG. 1, a hypercall access control layer 140, also referred to as a "single-point access control layer" 140 or an "abstract layer" 140, is provided between the hypervisor 130, the host machine 110 and the guest machines 120. In some embodiments, the hypercall access control layer 140 may also be included at least partially within the hypervisor 130. Moreover, as illustrated in FIG. 2, a hypercall access control layer 140 may also be provided between a plurality of hypervisors 130, a host machine 110 and a plurality of guest machines 120, in embodiments where one or more guest machines operate on different hypervisors 130. By providing single-point access control, security may be implemented at the hypervisor level instead of or in addition to at the host machine and/or guest machine level. Thus, compromise of the hypervisor 140 and/or the host machine 110 due to compromise of a guest application 124 and/or a guest kernel 122 of a given guest machine 120 may be reduced or prevented.

Figure 3:
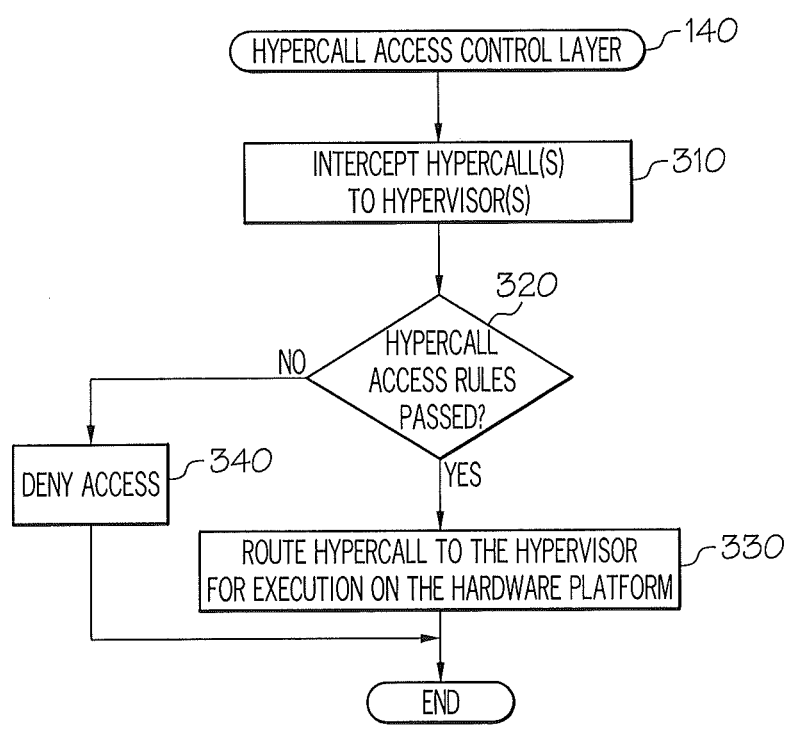
FIG. 3 is a flowchart of operations that may be performed by a hypercall access control layer according to various embodiments described herein.

FIG. 3 is a flowchart of operations that may be performed by a hypercall access control layer, such as the hypercall access control layer 140 of FIG. 1 or 2. Referring to FIG. 3, at Block 310, one or more hypercalls for the host machine 110 and/or one or more guest machines 120 to one or more hypervisors 130 is intercepted. The intercepting of hypercalls from host machine 110 and/or guest machines 120 to a hypervisor 130 may also be regarded as "hijacking" a hypercall and redirecting the hypercall to the abstract layer 140 for purposes of determining whether access is valid. Thus, at Block 320, a determination is made as to whether hypercall access rules have been passed. If "yes", then at Block 330, the hypercall that was intercepted is routed to the hypervisor 130 for execution on the hardware platform 110.

If not, at Block 340, access to the hypervisor 130 is denied. Thus, the operations of Blocks 320, 330 and 340 may be regarded as substituting a new access control handler (referred to as a "hypercall access control handler") for the existing access control handler in the host or guest machine. The substituted hypercall access control handler can decide whether or not to grant access to the hypervisor 130.

Figure 4:
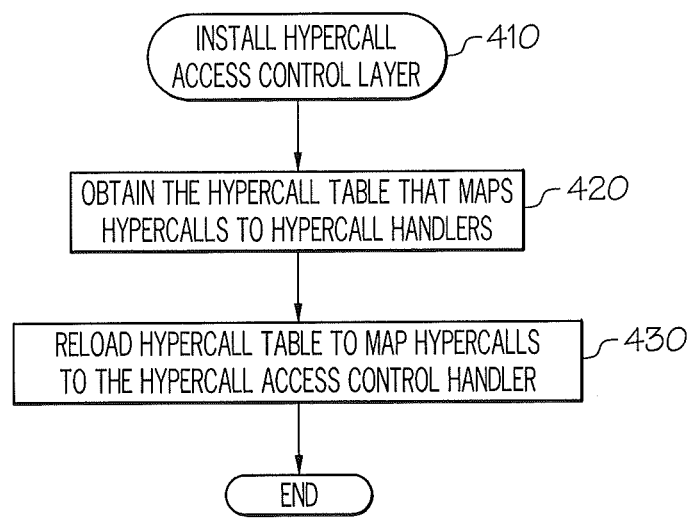
FIG. 4 is a flowchart of operations that may be performed upon initialization or installation of a hypercall access control layer according to various embodiments described herein.

FIG. 4 is a flowchart of operations that may be performed upon initialization or installation of a hypercall access control layer, so as to allow the intercepting of hypercalls to hypervisors at Block 310. Referring to FIG. 4, at Block 410, various operations may be performed to install or initialize the hypercall access control layer 140. For example, the host machine 110 or guest machines 120 may be registered with the hypercall access control layer 140. At Block 420, as part of these operations, a hypercall table is obtained that maps hypercalls from a respective host machine 110 and/or guest machine 120 to hypercall handlers. It will be understood that a hypercall table may be thought of as a map between hypercalls and hypercall handlers, and may be embodied in the form of linked list or other relational construct, and may also be referred to as a Hypercall Access Table. For purposes of understanding, a hypercall table may be analogized to a system call table that is used in a non-virtualized environment.

Then, at Block 430, the hypercall table is reloaded to map the hypercalls to a hypercall access control handler, rather than to the actual hypercall handlers. Thus, in response to receipt of a hypercall, control is passed to the hypercall access control layer 140 due to the reloaded hypercall table, so that the access control layer 140 can determine whether hypercall access rules are passed (Block 320 of FIG. 3). For purposes of understanding, reloading of a hypercall table in a virtualized environment may be analogized to the way Host-based Access Control (HAC) reloads a system call table. Accordingly, the reloading operation need not be described further.

Figure 5:
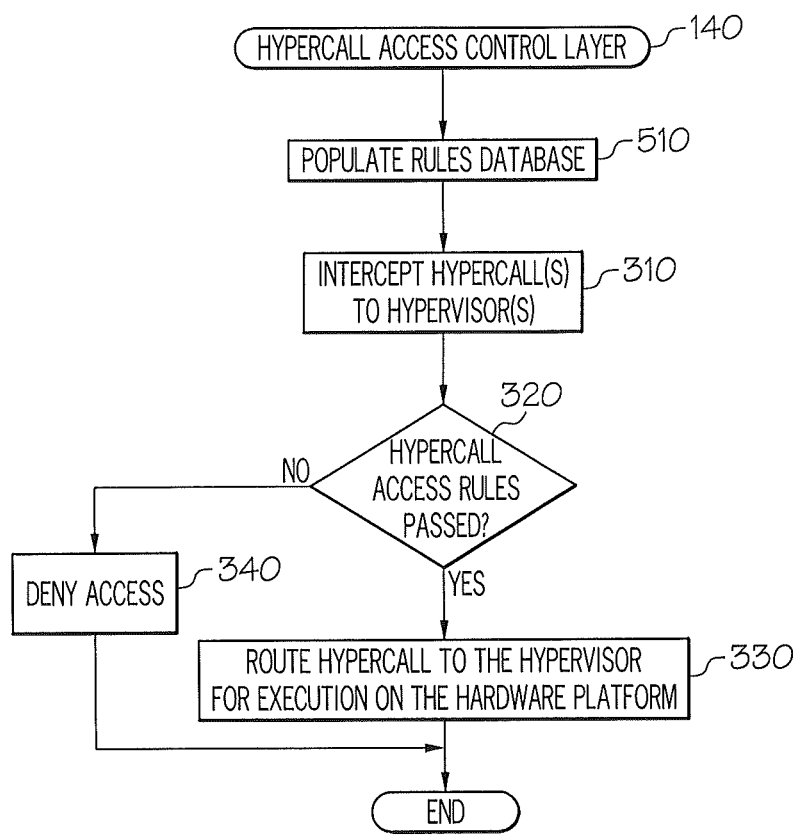
FIG. 5 is a flowchart of operations that may be performed by a hypercall access control layer according to various other embodiments described herein.

FIG. 5 is a flowchart of operations that may be performed by a hypercall access control layer 140 according to other embodiments described herein. Specifically, in FIG. 5, prior to intercepting hypercalls at Block 310, one or more rules databases is populated with the hypercall access rules for the host machine and/or guest machines at Block 510.

Figure 6:
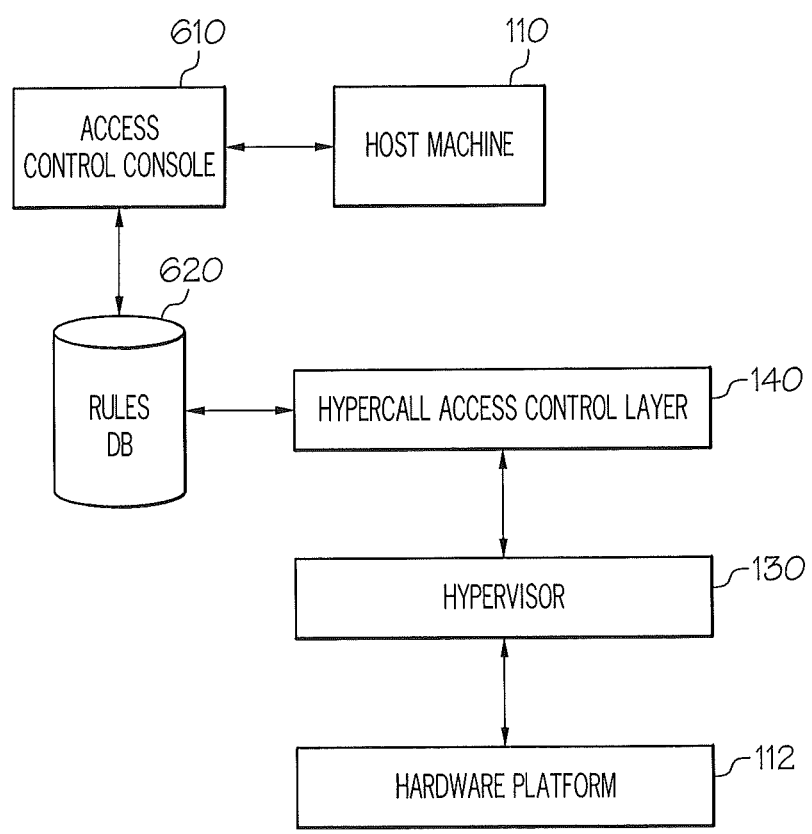
FIG. 6 is a block diagram of systems, methods and/or computer program products for providing hypercall-based security for hypervisors according to yet other embodiments described herein.

In some embodiments, the rules databases may be populated at Block 510 using a single access control console 610, as illustrated in FIG. 6. Referring to FIG. 6, the single, unified access control console 610 allows an administrator to interface with the host machine 110 and guest machines 120, obtain rules that relate to various aspects of user and/or application access for a host machine 110 and/or a guest machine 120, and to issue commands that can be used to populate a rules database(s) 620. Thus, the rules database 620 may contain global access rules that apply to various users and/or guest applications 124 that are operating in the virtualized computing environment 100. The access control console 610 may interface with the host machine 110 to allow deployment of the hypercall access rules so that hypercall interception occurs as per policy. A local rules database may also be provided in some embodiments, as will be described below with reference to FIG. 8.

In a conventional virtual machine environment, virtual machine access control management may be very cumbersome due to the existence of many consoles in a virtual infrastructure. Moreover, it may be difficult to implement a fine-grained access policy across multiple hypervisors. There may be no restriction for a virtual infrastructure administrator, and different hypervisor providers may be implement resource access mechanisms for hardware resource provisioning in different ways.

In sharp contrast, various embodiments described herein can provide a single, unified access control console 610 that can provide a unified solution for access management of a host machine 110 and guest machines 120 from a single console. The unified access control console 610 may provide a logical layer of access control that can be used to manage the host machine 110 and multiple guest machines 120. A fine-grained access policy may be provided for virtual machine access management and a unified access policy may be provided across different hypervisors 130, to provide a single point of access control.

Figure 7:
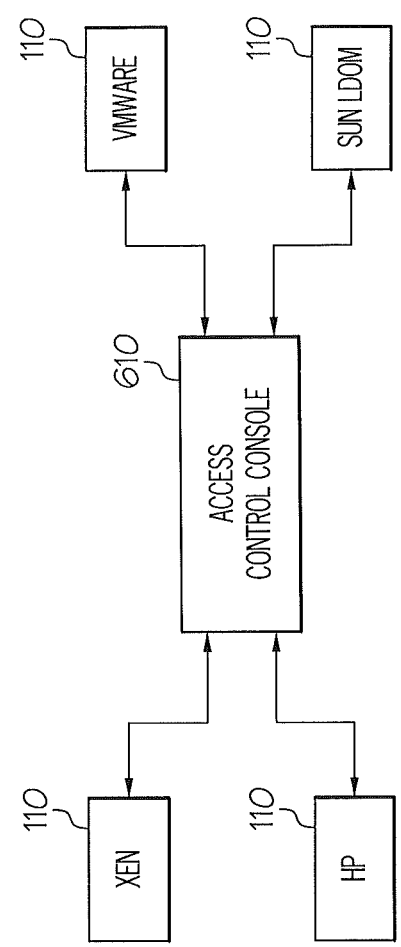
FIG. 7 is a block diagram of an access control console according to various embodiments described herein.

FIG. 7 is a block diagram of a unified access control console 610 that interfaces with a plurality of host machines 110 from multiple guest machine providers, according to various other embodiments. A virtual infrastructure administrator can use the unified access control console 610 to control access management for multiple virtual machines from a single-point control console 610 across different types of hypervisors. Role-based access management may be provided to control the type of access (Read, Create, Modify, Clone, Stop, Start, Restart, etc.) for virtual machines. Domain (subnet)-based access management may be provisioned to control access for a set of virtual machines belonging to a single customer and/or domain (if any). Moreover, conditional (time, date, month, etc.) user access may be provisioned. User level delegation may also be provisioned. Restriction of access may also be provisioned for the system administrator. Virtual machine access history from any source (application, direct user, any third party tool, direct remote procedure call connection, etc.) for the entire virtual infrastructure can be viewed from a single location by the designated user based on the role.

As was also described above, the access control console 610 may also be used to populate one or more rules databases 620 with hypercall access rules for a host machine and multiple guest machines 120. A host machine 110, a guest machine 120 and/or a domain may be subject to numerous policy statements. A few non-limiting examples of policy statements are as follows:

User Chris should be allowed to create a VM of RAM size MAX 500 MB & MIN 100 MB, CPU capacity MAX 1X2.4 GHz & MIN 0.5X2.4 GHz, NIC of MAX 1X1 GBPS & MIN 0.5X1 GBPS during office hours between 9 AM & 5 PM for week day for the customer domain ABC.

User Kathleen should be allowed to manage VMs to do start operation for the customer domain ABC during timing between 5 PM and 4 AM for all days.

User Gill should be allowed to see history of access and VM status for the customer domain ABC.

User Gill should only be allowed to modify and manage the VM1 and nobody else should be allowed to do any operation on the VM1.

User Gill should be allowed to delegate his role to Luis during his absence.

These pseudo policy statements may be translated into pseudo rules using a pseudo rule syntax. A non-limiting example is:

<PRIVILEGE> <USER>/<ROLE> <ACTION>
<VM_NAME>/<DOMAIN>
<VIRTUAL_HARDWARE_RESOURCE> <LIMIT>
<CONDITION_MATCH>.

A non-limiting example of a pseudo rule is as follows:
   ALLOW USER geoff ACTION modify VM image1 RAM MAX 100 MIN 50 COND APP ovs MONTH all DAY mon TIME START 17:00 END 19:00.

Figure 8:
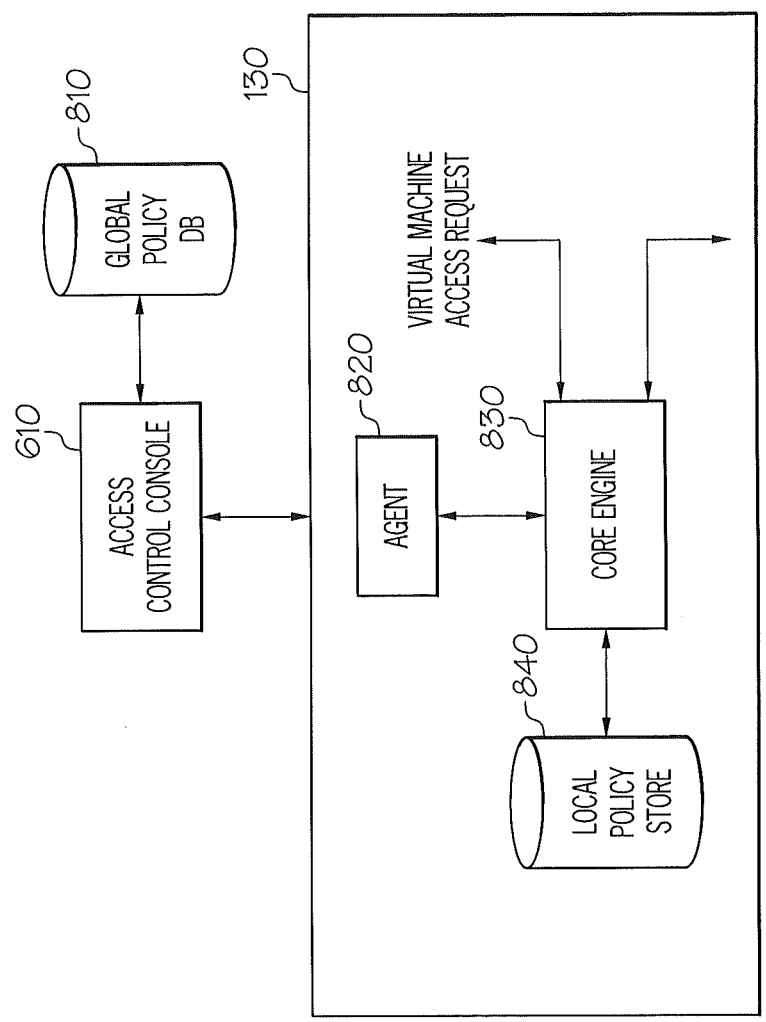
FIG. 8 is a block diagram of an access control console according to various other embodiments described herein.

FIG. 8 is a block diagram of another virtualization architecture employing a unified access control console 610. Referring to FIG. 8, in this architecture, a global policy database 810 may contain policies and rules as were contained in the rules database 620. A local policy store 840 also may be provided in the hypervisor 130 that may be populated and accessed by a core engine 830 of the hypervisor 130 via an agent 820 of the hypervisor 130. Thus, a centralized and/or distributed policy/rules database may be provided. The distributed model may be particularly useful where multiple hypervisors are used.

Moreover, in some embodiments, the agent 820 may be embodied to reload the hypercall table, similar to the way an HAC reloads a system call table, as was described extensively above. In other embodiments, a vendor-specific hook may be used to interrupt the access call. In still other embodiments, partnering may take place with a hypervisor vendor to provide provisioning for external access control.

In a particular use case implementation, role-based access management may be provisioned to control the type of access (Read, Create, Modify, Close, Stop, Start, Restart, etc.) for virtual machines. In another use case implementation, role-based access management may be provisioned to control the type of access (Read, Create, Modify, Close, Stop, Start, Restart, etc.) for virtual machines, by reloading the hypercall table in a similar way that an HAC reloads a system call table.

Additional discussion of a single-point hypercall access control layer 140 that provides access control between a host machine 110, a plurality of guest machines 120 and a hypervisor 130 according to various embodiments described herein, will now be provided.

Figure 9:
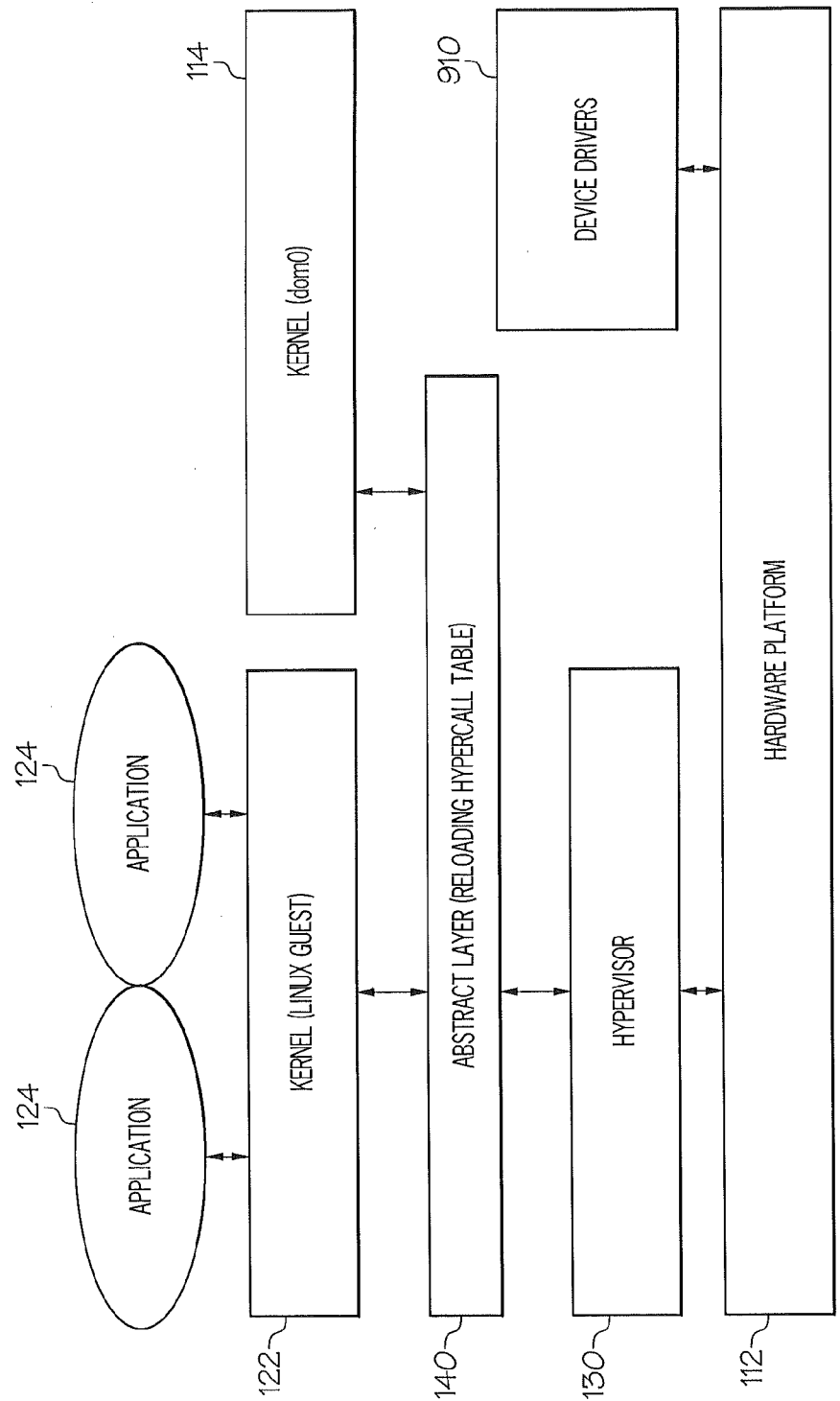
FIGS. 9-10 are block diagrams of systems, methods and/or computer program products for providing hypercall-based security for hypervisors according to still other embodiments described herein.
Figure 10:
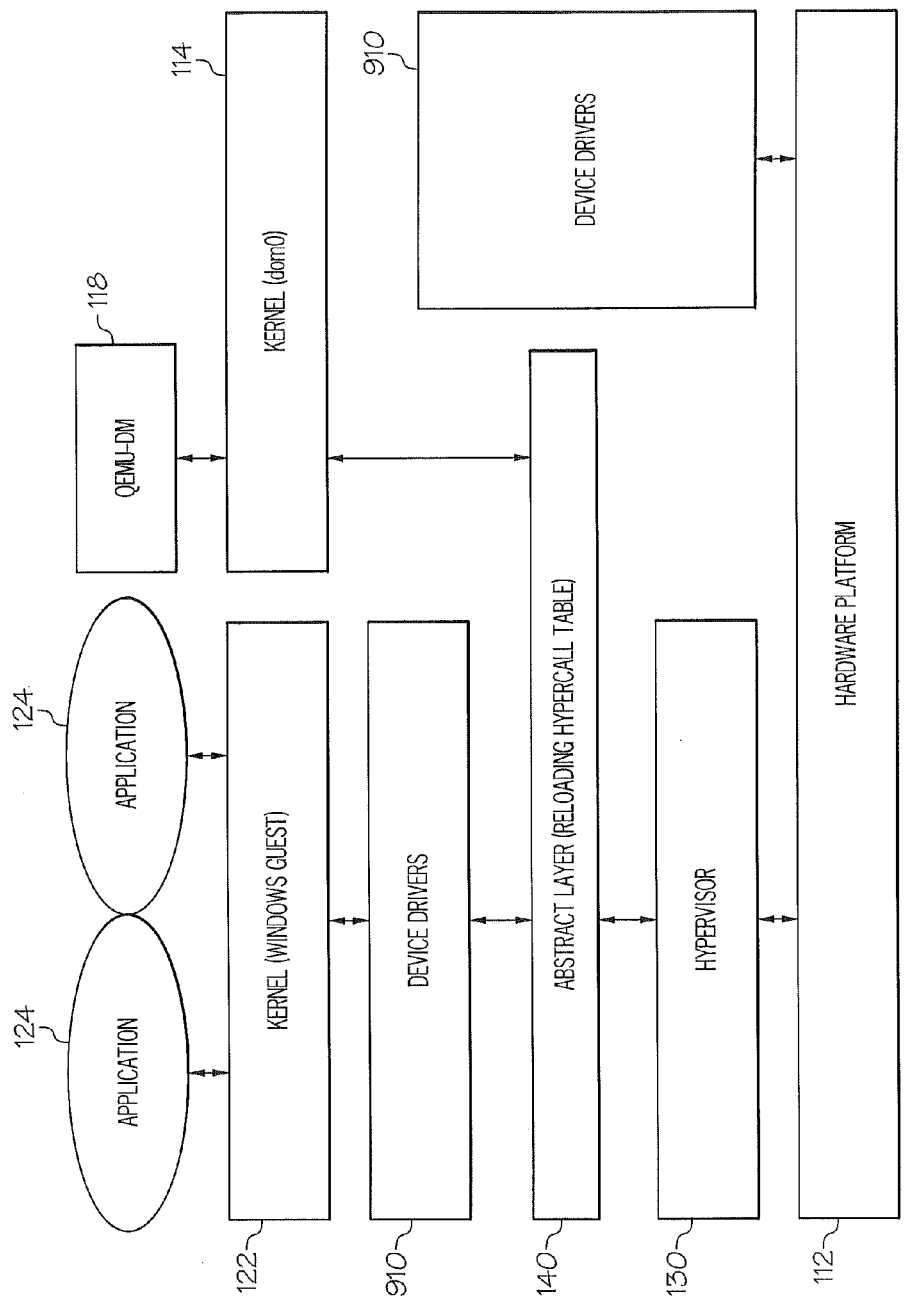

FIG. 9 illustrates an architecture that uses an XEN hypervisor having ParaVirtualization (PV). In FIG. 9, the single-point access control layer 140 is referred to as an "Abstract Layer (Reloading Hypercall Table)". Device drivers 910 are also illustrated. FIG. 10 provides another architectural illustration using an XEN hypervisor in full virtualization (HVM).

Figure 11:
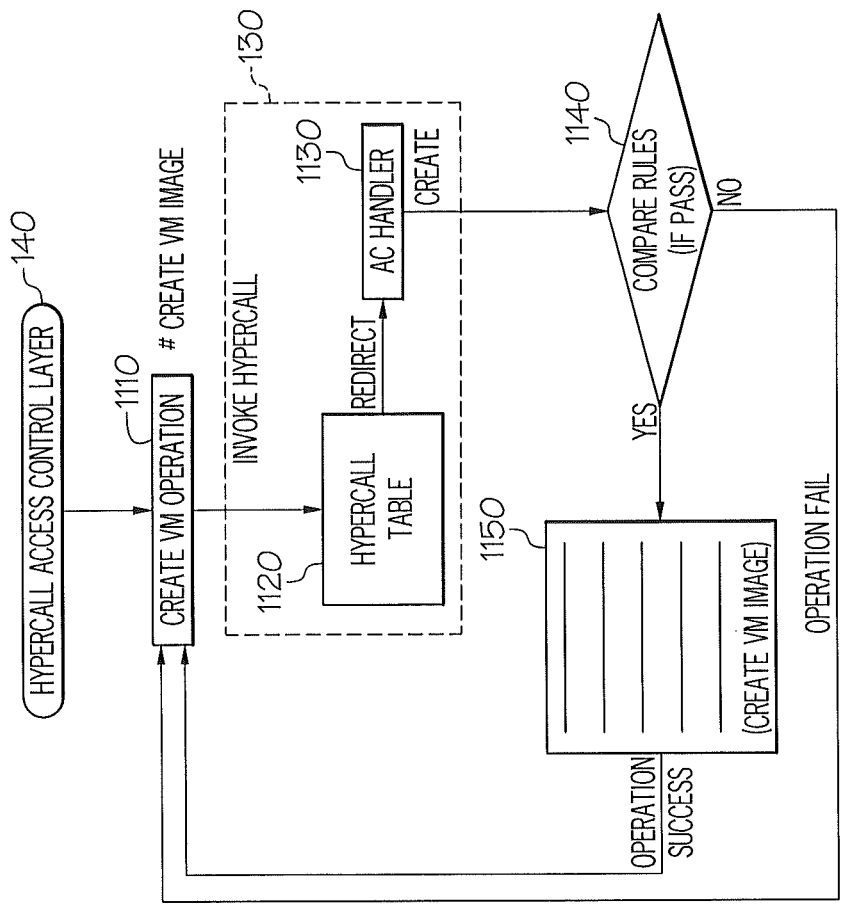
FIG. 11 is a flowchart of operations that may be performed by a hypercall access control layer according to various other embodiments described herein.

FIG. 11 is a flowchart of particular use case of the operations that may be performed in FIG. 3 by a hypercall access control layer 140. Referring to FIG. 11, the use case relates to the processing of a "Create VM Operation" 1110, for example by receiving the instruction "# Create VM Image". A hypercall is invoked upon receipt of the create VM operation 1110 by the hypervisor 130. The hypercall table 1120 for the create VM operation is obtained by the hypervisor 140 and is redirected or intercepted and processed by a hypercall Access Control (AC) handler 1130. The access control handler 1130 passes control to the single-point access control layer 140 to compare the access control request to the rules base and determine whether it passes at Block 1140, which may be analogized to the operations of Block 320. If "yes", then at Block 1150, the hypercall table for the create VM image 1150 is passed to the proper hardware handler, and the operation is a success. If "no", the operation fails, the hypercall table is not passed to the hardware handler, and an indication may be provided that the operation has failed.

Accordingly, various embodiments described herein can provide a single point of hypervisor access control for virtual environments. The solution can be the same and common across multiple vendors, to provide a unified solution for heterogeneous virtual infrastructures. Moreover, the security layer is closer to the resources being secured, by placing security below the kernel and above the hypervisor level. The concept of a hypercall reload is used in the context of hypervisor-related security, to implement the security close to the resource by intercepting the hypercall. Security may be orchestrated across-different hypervisors from a single console through self-written policies and/or by importing predefined policies from other systems. Fine-grained access policies for virtual machine access management may thereby be provided.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A virtualization method comprising:
    intercepting a plurality of hypercalls for a host virtual machine and a plurality of guest virtual machines to a hypervisor, the intercepting being performed by a hypercall access control layer that is separate from the host virtual machine, and the plurality of guest virtual machines, that is included at least partially within the hypervisor, and that provides access control between the host virtual machine, the plurality of guest virtual machines and the hypervisor,
        wherein the hypercall access control layer comprises hypercall access control handlers implementing hype call access rules,
        wherein the hypercall comprises a software trap from the host virtual machine and/or one of the plurality of guest virtual machines to the hypervisor; and
    routing a respective one of the hypercalls comprising the software trap from the host virtual machine and/or one of the plurality of guest virtual machines to the hypervisor for execution on a hardware platform, responsive to the respective one of the hypercalls comprising the software trap from the host virtual machine and/or one of the plurality of guest virtual machines to the hypervisor passing the hypercall access rules,
    wherein the hypervisor includes a respective hypercall table that maps hypercalls comprising the software trap from the host virtual machine and/or one of the plurality of guest virtual machines to the hypervisor for a respective host virtual machine and guest virtual machine to hypercall handlers and wherein the intercepting comprises:
    initiating reloading the respective hypercall table in the hypervisor by the hypercall access control layer, to identify one of the hypercall access control handlers as the hypereall handier for the respective host virtual machine and guest virtual machine,
    wherein the respective hypercall table is separate from respective system call tables contained within the respective host virtual machine and guest virtual machines.

2. The virtualization method of claim 1 wherein the reloading is performed during initialization or installation of the hypercall access control layer.

3. The virtualization method of claim 1 wherein the intercepting is preceded by populating a rules database with the hypercall access rules for the host virtual machine and the plurality of guest virtual machines.

4. The virtualization method of claim 3 wherein the populating is performed by receiving commands from a single access control console that is configured to access the host virtual machine and the plurality of guest virtual machines.

5. The virtualization method of claim 1 wherein the intercepting comprises:
    intercepting a plurality of hypercalls comprising a plurality of software traps from a host virtual machine and a plurality of guest virtual machines to a plurality of hypervisors.

6. The virtualization method of claim 5 wherein the hypercall access control layer provides access control between the host virtual machine, the plurality of guest virtual machines and the plurality of hypervisors.

7. A virtualization computer program product comprising:
    a tangible non-transitory computer readable storage medium comprising computer readable program code embodied in the medium that when executed by at least one processor causes the at least one processor to perform operations comprising:
intercepting a plurality of hypercalls for a host virtual machine and a plurality of guest virtual machines to a hypervisor, the intercepting being performed by a hypercall access control layer that is separate from the host virtual machine, and the plurality of guest virtual machines, that is included at least partially within the hypervisor, and that provides access control between the host virtual machine, the plurality of guest virtual machines and the hypervisor,
  wherein the hypercall access control layer comprises hypercall access control handlers implementing hypercall access rules, and
  wherein the hypercall comprises a software trap from the host virtual machine and/or one of the plurality of guest virtual machines to the hypervisor; and,
routing a respective one of the hypercalls comprising the software trap from the host virtual machine and/or one of the plurality of guest virtual machines to the hypervisor for execution on a hardware platform, responsive to the respective one of the hyper calls comprising the software trap from the host virtual machine and/or one of the plurality of guest virtual machines to the hypervisor passing the hypercall access rules,
wherein the hypervisor includes a respective hypercall table that maps hypercalls comprising the software trap from the host virtual machine and/or one of the plurality of guest virtual machines to the hypervisor for a respective host virtual machine and guest virtual machine to hypercall handlers and wherein the intercepting comprises:
  initiating reloading the respective hypercall table in the hypervisor by the hypercall access control layer, to identify one of the hypercall access control handlers as the hypercall handier for the respective host virtual machine and guest virtual machine,
wherein the respective hypercall table is separate from respective system call tables contained within the respective host virtual machine and guest virtual machines.

8. The virtualization computer program product of claim 7 wherein the reloading is performed during initialization or installation of the hypercall access control layer.

9. The virtualization computer program product of claim 7 wherein the intercepting is preceded by populating a rules database with the hypercall access rules for the host virtual machine and the plurality of guest virtual machines.

10. The virtualization computer program product of claim 9 wherein the populating is performed by receiving commands from a single access control console that is configured to access the host virtual machine and the plurality of guest virtual machines.

11. The virtualization computer program product of claim 7 wherein the intercepting comprises:
  intercepting a plurality of hypercalls comprising a plurality of software traps from a host virtual machine and a plurality of guest virtual machines to a plurality of hypervisors.

12. The virtualization computer program product of claim 11 wherein the hypercall access control layer provides access control between the host virtual machine, the plurality of guest virtual machines and the plurality of hypervisors.

13. A virtual computer system comprising:
a hardware platform;
a host virtual machine and a plurality of guest virtual machines that run on the hardware platform;
a hypervisor that manages the host virtual machine and the plurality of guest virtual machines that run on the hardware platform; and
a hypercall access control layer that is separate from the host virtual machine and the plurality of guest virtual machines, that is included at least partially within the hypervisor, and that provides access control between the host virtual machine, the plurality of guest virtual machines and the hypervisor,
wherein the hypercall access control layer is configured to perform operations comprising:
  intercepting a plurality of hypercalls for the host virtual machine and the plurality of guest virtual machines to the hypervisor,
    wherein the hypercall access control layer comprises hypercall access control handlers implementing hypercall access rules, and
    wherein the hypercall comprises a software trap from the host virtual machine and/or one of the plurality of guest virtual machines to the hypervisor; and
  routing a respective one of the hypercalls comprising the software trap from the host virtual machine and/or one of the plurality of guest virtual machines to the hypervisor for execution on the hardware platform, responsive to the respective one of the hypercalls comprising the software trap from the host virtual machine and/or one of the plurality of guest virtual machines to the hypervisor passing the hypercall access rules, and
wherein the hypervisor includes a respective hypercall table that maps hypercalls comprising the software trap from the host virtual machine and/or one of the plurality of guest virtual machines to the hypervisor for a respective host virtual machine and guest virtual machine to hypercall handlers and wherein the intercepting comprises:
  initiating reloading the respective hypercall table in the hypervisor by the hypercall access control layer, to identify one of the hypercall access control handlers as the hypercall handler for the respective host virtual machine and guest virtual machine,
wherein the respective hypercall table is separate from respective system call tables contained within the respective host virtual machine and guest virtual machines.

14. The virtual computer system of claim 13 wherein the intercepting is preceded by populating a rules database with the hypercall access rules for the host virtual machine and the plurality of guest virtual machines.

15. The virtual computer system of claim 14 further comprising a single access control console that is configured to access the host virtual machine and the plurality of guest virtual machines, and wherein the populating is performed by receiving commands from the single access control console.

16. The virtual computer system of claim 13 wherein the reloading is performed during initialization or installation of the hypercall access control layer.

17. The virtual computer system of claim 13 further comprising:
a plurality of hypervisors that manage running of the host virtual machine and the plurality of guest virtual machines on the hardware platform;
wherein the hypercall access control layer provides access control between the host virtual machine, the plurality of guest virtual machines and the plurality of hypervisors.

18. The virtualization method of claim 3 wherein populating the rules database with the hypercall access rules for the host virtual machine and the plurality of guest virtual machines comprises:

accessing, responsive to the hypervisor, a local policy store local to a hardware platform running the hypervisor, wherein the local policy store comprises local policies and rules for the hypercall access control layer; and accessing, responsive to the hypervisor, a global policy database remote from the hardware platform running the hypervisor, wherein the global policy database comprises global policies and rules for the hypercall access control layer.

19. The virtualization computer program product of claim 9 wherein populating the rules database with the hypercall access rules for the host virtual machine and the plurality of guest virtual machines comprises:

accessing, responsive to the hypervisor, a local policy store local to a hardware platform running the hypervisor, wherein the local policy store comprises local policies and rules for the hypercall access control layer; and accessing, responsive to the hypervisor, a global policy database remote from the hardware, platform running the hypervisor, wherein the global policy database comprises global policies and rules for the hypercall access control layer.

20. The virtual computer system of claim 14 wherein populating the rules database with the trypercall access rules for the host virtual machine and the plurality of guest virtual machines comprises:

accessing, responsive to the hypervisor, a local policy store local to the hardware platform running the hypervisor, wherein the local policy store comprises local policies and rules for the hypercall access control layer; and accessing, responsive to the hypervisor, a global policy database remote from the hardware platform running the hypervisor, wherein the global policy database comprises global policies and rules for the hypercall access control layer.

\* \* \* \* \*